US012199822B2

(12) United States Patent
Yoneda et al.

(10) Patent No.: US 12,199,822 B2
(45) Date of Patent: Jan. 14, 2025

(54) CONTROL SYSTEM, CONTROL DEVICE, AND NON-TRANSITORY COMPUTER-READABLE RECORDING MEDIUM RECORDING PROGRAM

(71) Applicant: OMRON Corporation, Kyoto (JP)

(72) Inventors: Mitsuhiro Yoneda, Kyoto (JP); Taiga Niimi, Kyoto (JP); Ryota Akai, Kyoto (JP); Nobuyuki Sakatani, Kyoto (JP); Shigenori Sawada, Kyoto (JP)

(73) Assignee: OMRON Corporation, Kyoto (JP)

( * ) Notice: Subject to any disclaimer, the term of this patent is extended or adjusted under 35 U.S.C. 154(b) by 318 days.

(21) Appl. No.: 17/627,688

(22) PCT Filed: Mar. 10, 2020

(86) PCT No.: PCT/JP2020/010384
§ 371 (c)(1),
(2) Date: Jan. 17, 2022

(87) PCT Pub. No.: WO2021/033358
PCT Pub. Date: Feb. 25, 2021

(65) Prior Publication Data
US 2022/0247632 A1    Aug. 4, 2022

(30) Foreign Application Priority Data
Aug. 20, 2019   (JP) .................. 2019-150137

(51) Int. Cl.
*H04L 41/0816* (2022.01)
*H04L 41/0823* (2022.01)
*H04L 69/28* (2022.01)

(52) U.S. Cl.
CPC ...... *H04L 41/0816* (2013.01); *H04L 41/0823* (2013.01); *H04L 69/28* (2013.01)

(58) Field of Classification Search
None
See application file for complete search history.

(56) References Cited

U.S. PATENT DOCUMENTS 5,887,029 A    3/1999  Husted et al.
7,818,457 B1*  10/2010 Flood ................ H04L 12/403
                                                 713/400

(Continued)

FOREIGN PATENT DOCUMENTS

CN    104509038    4/2015
CN    109709929    5/2019

(Continued)

OTHER PUBLICATIONS

"International Search Report (Form PCT/ISA/210) of PCT/JP2020/010384," mailed on Jun. 16, 2020, with English translation thereof, pp. 1-4.

(Continued)

*Primary Examiner* — Anh Vu H Ly
(74) *Attorney, Agent, or Firm* — JCIPRNET

(57) ABSTRACT

According to the present invention, when there is a change in a network configuration, timers of a changed network configuration are synchronized with a timer having high accuracy among the timers. This control system has a network configuration in which one or more control devices each for controlling a target can be communicably connected to a network, and each of the one or more control devices has: a timer for managing time with accuracy; a communicator for transmitting a control command to a target corresponding to said control device on the basis of the time managed by the timer; and a timer synchronizer that, when the network configuration is changed, time-synchronizes, among timers of each control device of a (Continued)

changed network configuration, timers with another timer having higher accuracy than the timers.

13 Claims, 10 Drawing Sheets

(56) References Cited

U.S. PATENT DOCUMENTS

| | | | | |
|---|---|---|---|---|
| 8,930,579 | B2* | 1/2015 | Pleasant | H04J 3/0664 |
| | | | | 709/224 |
| 2005/0267953 | A1 | 12/2005 | Suzuki et al. | |
| 2015/0078200 | A1* | 3/2015 | Kalkunte | H04L 45/72 |
| | | | | 370/254 |
| 2017/0099157 | A1* | 4/2017 | Jacobson | H04L 12/2814 |
| 2018/0109655 | A1* | 4/2018 | Ichimura | G05B 19/4185 |
| 2019/0306897 | A1* | 10/2019 | Montemurro | H04W 76/10 |
| 2019/0372746 | A1* | 12/2019 | Tamura | H04L 7/0004 |
| 2020/0186420 | A1* | 6/2020 | Yoneda | H04L 69/28 |
| 2021/0135836 | A1* | 5/2021 | Yoneda | H04L 12/28 |
| 2021/0273736 | A1* | 9/2021 | Li | H04W 76/12 |
| 2022/0413474 | A1* | 12/2022 | Nishiyama | G05B 19/41865 |

FOREIGN PATENT DOCUMENTS

| | | |
|---|---|---|
| EP | 3461038 | 3/2019 |
| JP | 2004192256 | 7/2004 |
| JP | 2005014150 | 1/2005 |
| JP | 2006310964 | 11/2006 |
| JP | 2013108895 | 6/2013 |
| JP | 2015118505 | 6/2015 |
| JP | 6523589 | 6/2019 |
| WO | 2019058861 | 3/2019 |

OTHER PUBLICATIONS

"Written Opinion of the International Searching Authority (Form PCT/ISA/237) of PCT/JP2020/010384," mailed on Jun. 16, 2020, with English translation thereof, pp. 1-6.
James T. Carlo et al., "IEEE Standard for a Precision Clock Synchronization Protocol for Networked Measurement and Control Systems", IEEE Instrumentation and Measurement Society, Jan. 1, 2002, pp. 1-151.
"Search Report of Europe Counterpart Application", issued on Aug. 14, 2023, p. 1-p. 11.
"Office Action of China Counterpart Application", issued on Feb. 4, 2024, with English translation thereof, pp. 1-17.

* cited by examiner

CONTROL SYSTEM, CONTROL DEVICE, AND NON-TRANSITORY COMPUTER-READABLE RECORDING MEDIUM RECORDING PROGRAM

CROSS-REFERENCE TO RELATED APPLICATION

This application is a 371 application of the International PCT application serial no. PCT/JP2020/010384, filed on Mar. 10, 2020, which claims the priority benefits of Japan Patent Application No. 2019-150137, filed on Aug. 20, 2019. The entirety of each of the above-mentioned patent applications is hereby incorporated by reference herein and made a part of this specification.

TECHNICAL FIELD

The present invention relates to a control system in which a plurality of control devices is connected to a network, a control device, and a non-transitory computer-readable recording medium recording a program.

BACKGROUND ART

A factory automation (FA) technique using a control device such as a programmable logic controller (PLC) is widely used in various production sites. Such a control device controls operations of one or a plurality of apparatuses by transmitting and receiving data to and from the one or plurality of apparatuses via a network.

With the increasing functionality of control systems, configurations are being realized in which a plurality of control devices that executes control processes independent of each other is connected via a network. For example, Japanese Patent Laid-Open No. 2015-118505 (Patent Literature 1) discloses a control system in which a plurality of control devices is connected to a controller level network. Each control device is connected to a plurality of input/output devices via a device level network. Each control device transmits input values acquired from the plurality of input/output devices to a server via the controller level network. Each control device has a timer that repeats clocking in a constant tact cycle, and the timers are synchronized between the control devices.

CITATION LIST

Patent Literature

[Patent Literature 1]
Japanese Patent Laid-Open No. 2015-118505

SUMMARY OF INVENTION

Technical Problem

At a manufacturing site, a production line may be rearranged for various reasons such as changing production varieties and increasing a production quantity. In this case, a network configuration is changed by adding a control device connected to a network or the like, but it is desired to synchronize timers with the timer having the highest accuracy between control devices such that the existing control devices are able to cooperate with the added control device and thus the tact time or the like can be maintained accurately even in the changed network configuration. Patent Literature 1 does not propose a technique for synchronizing timers with a highly accurate timer between control devices in a case where a network configuration is changed.

The present disclosure is to provide a control system, a control device, and a non-transitory computer-readable recording medium recording a program capable of, when there is a change of a network configuration, synchronizing timers of the changed network configuration with a timer having the highest accuracy among the timers.

Solution to Problem

According to the present disclosure, there is provided a control system including a network configuration in which one or more control devices each of which controls a target are communicably connected to a network, in which each of the one or more control devices includes a timer that manages time having an accuracy, a communicator for transmitting a control command to the target corresponding to the control device with the time managed by the timer as a reference, and a timer synchronizer for, when the network configuration is changed, time-synchronizing, among timers of the respective control devices of the changed network configuration, other timers with a timer having a higher time accuracy than time accuracies of any of the other timers.

According to the present disclosure, in a case where the network configuration is changed, the other timers can be time-synchronized with the timer having the highest time accuracy in the changed network configuration. Consequently, the control system can automatically time-synchronize the timers of the network configuration with the timer that manages time having the highest accuracy each time the network configuration is changed.

In the above disclosure, the control devices that are connectable to the network configuration include a first control device that is in operation and a second control device that is different from the first control device, and the change of the network configuration includes that the second control device is added to the network configuration to which the first control device in operation is connected.

According to the above disclosure, even if the network configuration to which the control device in operation is connected is changed, the timers of the changed network configuration can be automatically time-synchronized with the timer that manages time having the highest accuracy.

In the above disclosure, each of the control devices further includes a message communicator for performing communication of a message having an accuracy of the timer of the own device, and the timer synchronizer compares the accuracy of the message received from another control device with the accuracy of the timer of the own device, and selects the timer having the higher time accuracy on the basis of a comparison result.

According to the above disclosure, it is possible to select the timer having a higher time accuracy from the message of which communication has been performed between the control devices.

In the above disclosure, in a case where the timer having the higher time accuracy is provided in the second control device, the timer synchronizer time-synchronizes the timer of the second control device with a timer of the first control device, and then time-synchronizes the timer of the first control device with the timer of the second control device.

According to the above disclosure, in a case where the timer of the first control device in operation is time-synchronized with the timer having the higher time accuracy of the second control device, time synchronization is performed in multiple stages such as the timer of the second control device being temporarily time-synchronized with the time of the first control device and then the timer of the first control device in operation being time-synchronized with the timer having the higher time accuracy of the second control device. Consequently, compared with a case where the timer of the control device in operation is suddenly time-synchronized with the timer having the higher time accuracy, in a case where the communicator of the first control device transmits a control command to the target corresponding to the control device with the time managed by the timer as a reference, it is possible to prevent the reference time from varying significantly and thus to control the target in a stable manner.

In the above disclosure, the control device further includes a storage part for storing network configuration information including an identifier of a control device connected to the network configuration, and the first control device collates an identifier of the second control device with the network configuration information, and detects that the second control device has been added to the network configuration on the basis of a collation result.

According to the present disclosure, the control device can autonomously detect that the network configuration has been changed through the above collation.

In the above disclosure, the second control device includes a control device that operates in cooperation with the first control device in operation when the control device is added to the network configuration, and each of the control devices detects whether the own device is the first control device or the second control device.

According to the present disclosure, the control device autonomously detects whether the own device is the first control device or the second control device, and the control device detecting that the own device is the first control device autonomously detects the change of the network configuration.

In the above disclosure, the timer synchronizer repeatedly performs a process of updating the times of the other timers in a predetermined adjustment amount N times (where N≥2), and the predetermined adjustment amount includes each of adjustment amounts obtained by dividing a magnitude of a time difference between the other timers and the timer having the higher time accuracy into N pieces.

According to the above disclosure, in a case where the other timers are time-synchronized with the timer having the highest time accuracy, times of the other timers can be gradually adjusted to the time of the timer having the highest time accuracy by repeating the adjustment based on the magnitude of the time difference N times. Consequently, compared with a case where the timer of the control device in operation is suddenly time-synchronized with the timer having the highest time accuracy, in a case where the communicator of the first control device transmits a control command to the target corresponding to the control device with the time managed by the timer as a reference, it is possible to prevent the reference time from fluctuating significantly and thus to control the target in a stable manner.

According to the present disclosure, there is provided a control device that controls a target, including a part for communicating with a network that communicably connects a plurality of the control devices; a timer that manages time having an accuracy; a communicator for transmitting a control command to the target corresponding to the control device with the time managed by the timer as a reference; and a timer synchronizer for, when the control device communicably connected to the network is changed, time-synchronizing, among timers of the plurality of respective control devices connected to the network after the change, other timers with a timer having a higher time accuracy than time accuracies of any of the other timers.

According to the above disclosure, in a case where the network configuration is changed, the other timers can be time-synchronized with the timer having the highest time accuracy in the changed network configuration. Consequently, the control system can automatically time-synchronize the timers of the network configuration with the timer that manages time having the highest accuracy each time the network configuration is changed.

According to the present disclosure, there is provided a non-transitory computer-readable recording medium recording a program causing a computer to execute a method of synchronizing time with a control device that controls a target. The control device includes a part for communicating with a network that communicably connects a plurality of the control devices, a timer that manages time having an accuracy, and a communicator for transmitting a control command to the target corresponding to the control device with the time managed by the timer as a reference, and the method includes a step of, when the control device communicably connected to the network is changed, detecting a timer having a higher time accuracy than time accuracies of any of other timers among timers of the plurality of respective control devices connected to the network after the change; and a step of time-synchronizing the other timers with the timer having the highest time accuracy.

According to the above disclosure, in a case where the network configuration is changed, the other timers can be time-synchronized with the timer having the highest time accuracy in the changed network configuration. Consequently, the control system can automatically time-synchronize the timers of the network configuration with the timer that manages time having the highest accuracy each time the network configuration is changed.

Advantageous Effects of Invention

According to the present disclosure, when there is a change of a network configuration, timers of the changed network configuration can be synchronized with a timer having a highest accuracy among the timers.

DESCRIPTION OF EMBODIMENTS

Figure 1:
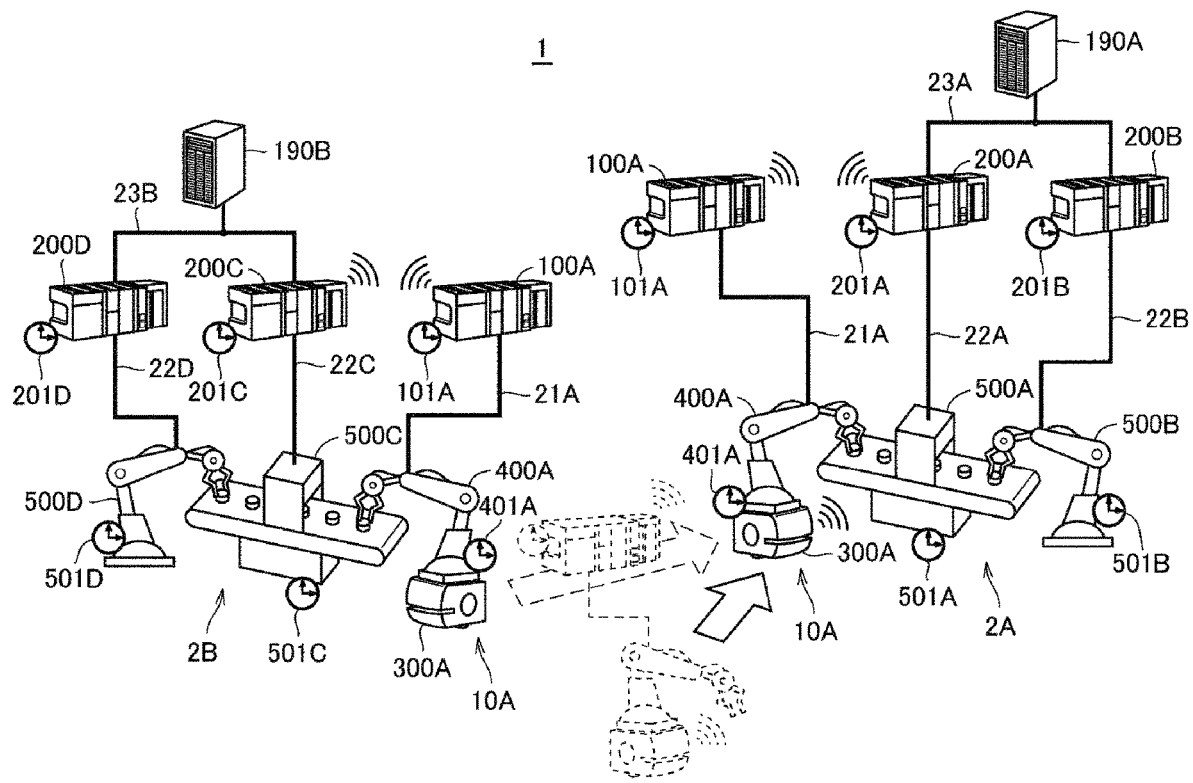
FIG. 1 is a diagram schematically illustrating an outline of a control system 1 according to an embodiment.

Hereinafter, embodiments according to the present invention will be described with reference to the drawings. In the following description, the same components and constituents are given the same reference numerals. Their names and functions are the same. Therefore, detailed description of these will not be repeated.

A. Application Example

First, an example of a scene in which the present invention is applied will be described with reference to FIG. 1. FIG. 1 is a diagram schematically illustrating an outline of a control system 1 according to an embodiment. A network of the control system 1 includes one or a plurality of control devices controlling a manufacturing device, a production facility, or the like, and is configured to satisfy requirements for a so-called industrial network or requirements for conforming to the industrial network. As one of such requirements, the time at which data (control system data) transmitted from a transmission source arrives at a destination is guaranteed.

In the present embodiment, in order to satisfy such a requirement, time synchronization between devices is realized, for example, by employing a high-accuracy time synchronization protocol such as that of the Institute of Electrical and Electronics Engineers (IEEE) 1588, IEEE 802.1AS, or IEEE 802.1AS-Rev of Time-Sensitive Networking (TSN).

With reference to (A) of FIG. 1, a production line 2A that is an example of the control system 1 of the present embodiment includes control devices 200A and 200B. The control devices 200A and 200B control field apparatuses that are control target apparatuses. Specifically, the control devices 200A and 200B are respectively connected to field apparatuses 500A and 500B via field networks 22A and 22B, and control the field apparatuses 500A and 500B. The number of field apparatuses connected to each of the control devices 200A and 200B is not limited to one, and may be a plurality. The field apparatuses 500A and 500B include, for example, sensors and actuators.

Each of the control devices 200A and 200B executes an input/output (IO) refresh process, a control calculation process, a motion process, and other processes in every control cycle.

The IO refresh process is a process for transmitting and receiving data between the control device and the field apparatus via the field network. Specifically, a field value including a state value indicating a state of the apparatus is received from the field apparatus via the field network, and a control command (a command value or a control amount, or the like) for controlling the field apparatus is transmitted via the field network.

The control calculation process includes control calculation or the like freely created according to a control target. Specifically, in the control calculation process, a calculation instruction is executed by using the field value received in the IO refresh process, and a control command as an execution result is output.

The motion process is a process of calculating, as a control command, a numerical value such as a position, a speed, an acceleration, a jerk, an angle, an angular velocity, an angular acceleration, or an angular jerk with respect to an actuator such as a servo motor provided in the field apparatus on the basis of the above field value.

The control devices 200A and 200B respectively have timers 201A and 201B that are time-synchronized with the connected field apparatuses. The control devices 200A and 200B execute the above IO refresh process, a user program execution process, the motion process, and the like according to the times of the timers 201A and 201B, respectively. Consequently, the control devices 200A and 200B each transmit a control command to the field apparatuses connected to the control device according to the time managed by the timers time-synchronized with each other as a reference, and can thus control the field apparatuses while synchronizing the field apparatuses of the control system 1.

The field apparatus 500A controlled by the control device 200A and the field apparatus 500B controlled by the control device 200B are fixedly installed on the production line 2A and process workpieces conveyed on the production line 2A.

The controller 200A and the controller 200B are connected to a controller level network 23A. A management device 190A is connected to the network 23A. The network 23A establishes a data link between the control devices 200A and 200B and the management device 190A. With the data link, the management device 190A can manage cooperative operations with the field apparatus 500A controlled by the control device 200A and the field apparatus 500B controlled by the control device 200B. In order to realize the cooperative operations, the timer 201A of the control device 200A and a timer 501A of the field apparatus 500A are time-synchronized with each other, and the timer 201B of the control device 200B and a timer 501B of the field apparatus 500B are time-synchronized with each other. The timers 201A and 201B of the control devices 200A and 200B are also time-synchronized with each other. Consequently, the control system 1 can control all the field apparatuses while synchronizing the field apparatuses with each other.

In the control system 1, the network configuration of the control system 1 may be changed by adding a moving system 10A to the production line 2A due to an increase in a production quantity in the production line 2A or a setup change ((B) of FIG. 1). The network configuration in which one or a plurality of control devices is communicably connected to the network 23A may be changed. That is, a control device connected to the network 23A may be changed. Such changes include, but are not limited to, a change of a model of a control device or the number of control devices connected to the network 23A.

For example, a scene in which the network configuration of the control system 1 is changed from (A) of FIG. 1 to (B) of FIG. 1 will be described. In (B) of FIG. 1, the moving system 10A added to the production line 2A has moved from another production line 2B. The moving system 10A is not limited to being provided in the production line 2B.

The production line 2B includes control devices 200C and 200D, and the moving system 10A. The control devices 200C and 200D respectively have timers 201C and 201D that are time-synchronized with connected field apparatuses.

The control devices 200C and 200D are respectively connected to field apparatuses 500C and 500D via field networks 22C and 22D, and control the field apparatuses 500C and 500D. The controller 200C and the controller 200D are connected to a controller level network 23B. A management device 190B is connected to the network 23B. Since the management device 190B connected to the network 23B has the same functions as those of the management device 190A described above, the description thereof will not be repeated.

In order to realize cooperative operations, the timer 201C of the control device 200C and a timer 501C of the field apparatus 500C are time-synchronized with each other, and the timer 201D of the control device 200D and a timer 501D of the field apparatus 500D are time-synchronized with each other. The timers 201C and 201D of the control devices 200C and 200D are also time-synchronized with each other.

The moving system 10A includes a control device 100A, a field apparatus 400A connected to the control device 100A via a field network 21A, and a moving mechanism 300A. The apparatus 400A is, for example, a robot arm including a sensor, an actuator, and the like, and performs some processes on workpieces on the production lines 2A and 2B. For example, according to a setup change in the production line, the moving system 10A is added to the network configuration by being communicably connected to a network of the production line, or is deleted from the network configuration by being disconnected from the network of the production line.

The moving system 10A is a system that is movable between a plurality of production lines including the production lines 2A and 2B. Specifically, the moving mechanism 300A is configured by, for example, an autonomous traveling robot, and when the moving mechanism 300A moves according to a target trajectory, the moving system 10A moves from the production line 2B to the production line 2A, and is communicably connected to the network 23A of the production line 2A. Consequently, the control device 100A and the field apparatus 400A included in the moving system 10A are added to the network configuration of the production line 2A, and thus the network configuration of the production line 2A is changed.

In a case where there is such a change of the network configuration, a control device detects (selects) a timer (hereinafter referred to as the grand master) having a higher time accuracy than that of other timers among the timers provided in the plurality of control devices in the changed network configuration, and performs a timer synchronization process of time-synchronizing the other timers with the detected grand master.

In the present embodiment, the time accuracy of the timer is generally the accuracy of the time managed (measured) by the timer (in for example, milliseconds or microseconds). Regarding the time accuracy, for example, in milliseconds is lower than in microseconds. The time accuracy may include the degree of stability indicating that the timer can measure time in a stable manner.

Consequently, whenever the network configuration is changed, the control system 1 performs selection of the grand master in the changed network configuration and the timer synchronization process based on the grand master, and can thus maintain high accuracy for the timers time-synchronized with each other in the control system 1.

B. Hardware Configuration Example of Control Device 100 and Field Apparatus 400

Figure 2:
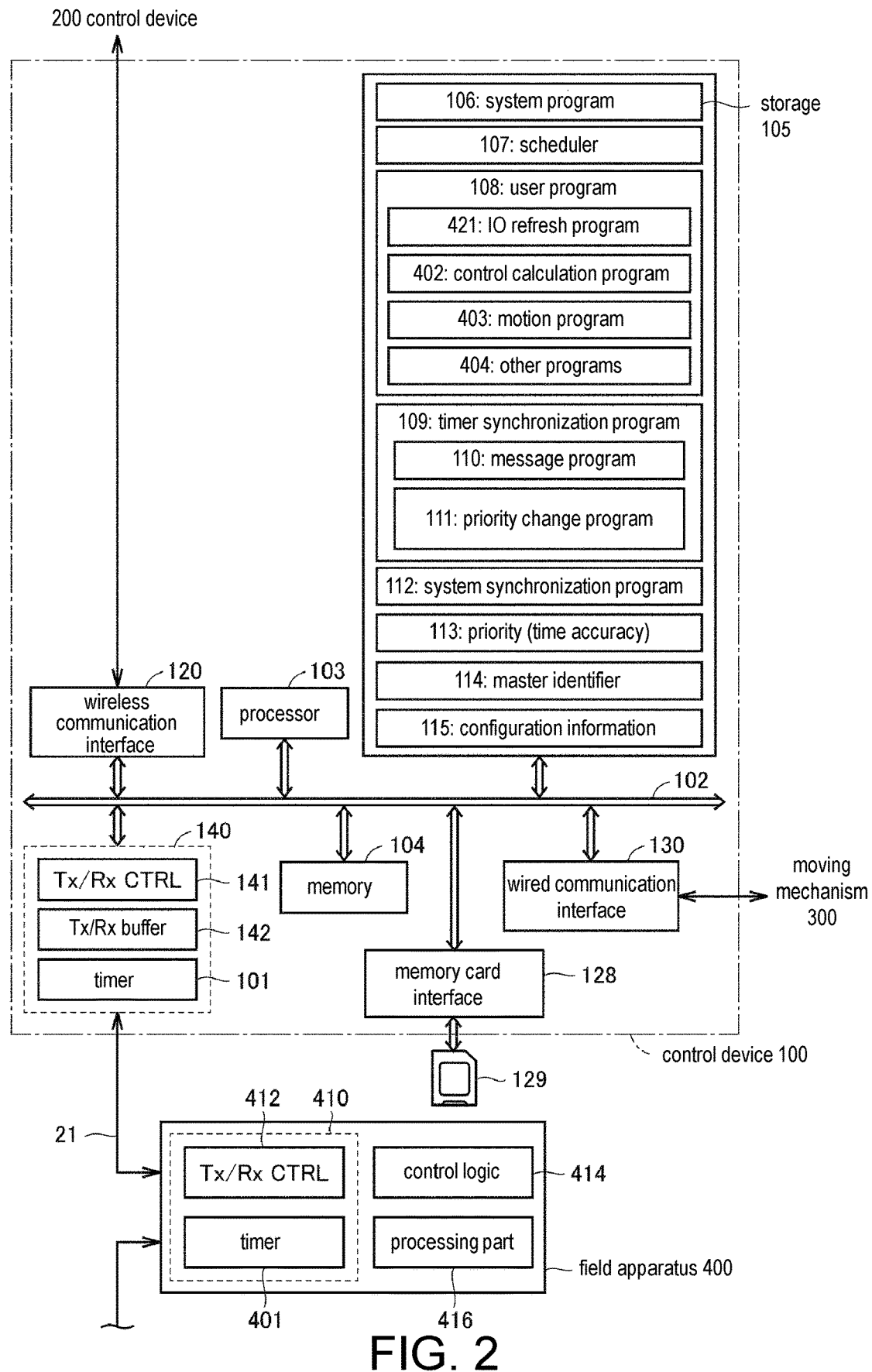
FIG. 2 is a block diagram illustrating a hardware configuration example of a control device and a field apparatus forming a moving system according to the present embodiment.

FIG. 2 is a block diagram illustrating a hardware configuration example of the control device and the field apparatus forming the moving system according to the present embodiment. With reference to FIG. 2, a hardware configuration of the control device 100A and the field apparatus 400A provided in the moving system 10 according to the present embodiment will be described. In FIG. 2, the control device 100A provided in the moving system 10A is illustrated as a control device 100, the field apparatus 400A provided in the moving system 10A is illustrated as a field apparatus 400, and the field network 21A is illustrated as a field network 21.

The control device 100 may be typically configured on the basis of a PLC. With reference to FIG. 2, the control device 100 includes, as main components, a processor 103, a memory 104, a storage 105, a wireless communication interface 120, a memory card interface 128, a wired communication interface 130, and a field network controller 140. These components included in the control device 100 are communicably connected to each other via an internal bus 102.

The processor 103 reads a program stored in the storage 105, loads the read program in the memory 104, and executes the loaded program to realize various processes. The memory 104 generally includes a volatile storage device. For example, the memory 104 includes a dynamic random access memory (DRAM), a static random access memory (SRAM), and the like.

The storage 105 stores a system program 106 including an operating system (OS) and an application program designed according to the control system 1 or a control target. The processor 103 executes an application program under the control of the system program 106. The storage 105 includes a non-volatile storage device such as a hard disk drive (HDD) or a solid state drive (SSD).

The application program includes a scheduler 107, a user program 108, a timer synchronization program 109, a system synchronization program 112, and the like. The storage 105 also stores a priority 113, a master identifier 114, and configuration information 115. The priority 113 is information indicating the time accuracy of the timer 101 included in the control device 100. The master identifier 114 is information for identifying a control device having a timer that is a grand master in a network configuration to which the control device 100 is connected. The configuration information 115 is information indicating the network configuration to which the control device 100 is connected, and includes, for example, information regarding a control device including an identifier of the control device connected to the network configuration and information regarding a field apparatus.

The user program 108 includes an IO refresh program 421 for the above IO refresh process, a control calculation program 402 for the control calculation process, a motion program 403 for the motion process, and other programs 404 for other processes. The control calculation program 402 includes, for example, a ladder program. The motion program 403 includes a robot program or the like for calculating a behavior of a robot that is a control target.

The other programs 404 are programs for performing processes independent of the control of the field apparatus, unlike the refresh process, the control calculation process, and the motion process. For example, the other programs 404 include programs related to system services. The programs related to system services include a program or the like for transferring data in order to store the data detected on the production line in databases provided in the management devices 190A and 190B. The programs include a program for generating an instruction such as writing data into logging files included in the management devices 190A and 190B and transmitting the instruction to the logging files. As described above, the other programs may include programs that are executed independently of the control cycle (that is, not executed periodically).

The timer synchronization program 109 includes instruction codes for realizing the timer synchronization process described above. Specifically, the timer synchronization program 109 includes a message program 110 for performing communication of an announcement message when a timer of a grand master is selected from the network configuration to which the control device 100 is connected, and a priority change program 111 for temporarily changing (rewriting) the priority 113.

The wireless communication interface 120 controls exchange of data via a wireless network. The wireless communication interface 120 according to the present embodiment controls exchange of data with the control device 200. The control device 100 may also exchange data with the control device 200 via a wire such as via the network 23A.

The memory card interface 128 is configured as an interface to and from which a memory card 129 is attachable and detachable, and can thus write data into the memory card 129 and read various data (user programs, trace data, and the like) from the memory card 129. The memory card 129 is a small storage medium, and includes, for example, a flash memory, and specifically includes an SD card or the like.

The wired communication interface 130 controls exchange of data via a wired network. The wired communication interface 130 of the present embodiment controls exchange of data with the moving mechanism 300.

The field network controller 140 provides an interface for the control device 100 to exchange data with the field apparatus 400 via the field network 21. As a protocol of the field network 21, EtherCAT (registered trademark) that is an example of a machine control network may be employed.

The field network controller 140 includes, as main components, a transmission/reception controller 141 (abbreviated to a Tx/Rx CTRL 141 in the figure), a transmission/reception buffer 142 (abbreviated to a Tx/Rx buffer 142 in the figure), and a timer 101. The timer 101 corresponds to the timer 101A illustrated in FIG. 1.

The transmission/reception controller 141 performs processes related to generation and reception of packets transmitted on the field network 21 in every control cycle. Specifically, the transmission/reception controller 141 writes data stored in a packet received from the field network 21 into the transmission/reception buffer 142. The transmission/reception controller 141 sequentially reads received packets written in the transmission/reception buffer 142, and outputs, among the read data, only data necessary for processes of the control device 100 to the processor 103. The transmission/reception controller 141 sequentially writes data or packets to be transmitted to the field apparatus 400 into the transmission/reception buffer 142 according to a command from the processor 103. The data stored in the transmission/reception buffer 142 is sequentially sent according to a cycle in which a packet is transferred on the field network controller 140.

The timer 101 manages time with a certain accuracy. Specifically, the timer 101 generates a pulse that serves as a reference timing for giving an instruction for data transmission or the like from the transmission/reception controller 141. As the timer 101, a real-time clock or a free-run counter that counts up (increments or decrements) in a predetermined cycle may be used. The current time can be calculated by handling a count value output by the free-run counter as an elapsed time from a certain point in time, and thus the free-run counter may be operated as a timer.

Therefore, the transmission/reception controller 141 corresponds to an example of a "communicator" for transmitting a control command to the field apparatus 400 that is a control target corresponding to the control device 100 with such time managed by the timer 101 as a reference.

The field apparatus 400 performs a process on a control target such as a machine or a facility under the control of the control device 100. Typically, the field apparatus 400 performs a process of collecting field information from a control target, a process of outputting a command signal to the control target, and the like. The field apparatus 400 includes, as main components, a field network controller 410, a control logic 414 for managing data transfer on the field network 21, and a processing part 416.

The field network controller 410 provides an interface for the field apparatus 400 to transmit and receive data to and from the control device 100 via the field network 21. The field network controller 410 includes a transmission/reception controller 412 (abbreviated to a Tx/Rx CTRL 412 in the figure) and a timer 401 as main components.

The transmission/reception controller 412 writes and reads data into and from a communication frame transferred on the field network 21.

The timer 401 generates a clock that serves as a reference for a timing of command output to the transmission/reception controller 412, and processing execution in the field apparatus 400. As the timer 401, a real-time clock or a free-run counter is used. The timer 401 is time-synchronized with the timer 101 with the timer 101 as a master.

The processing part 416 performs a process on a control target. For example, in a case where a control target is a servomotor, the processing part 416 generates a command for the servomotor on the basis of a command from the control device 100, and operates the servomotor according to the generated command. An encoder is provided on a rotation shaft of the servomotor, and the processing part 416 collects field information such as a position (rotation angle), a rotation speed, and a cumulative rotation speed of the servomotor from the encoder.

C. Hardware Configuration Example of Moving Mechanism 300

Next, a hardware configuration of the moving mechanism 300 included in the moving system 10 according to the present embodiment will be described.

Figure 3:
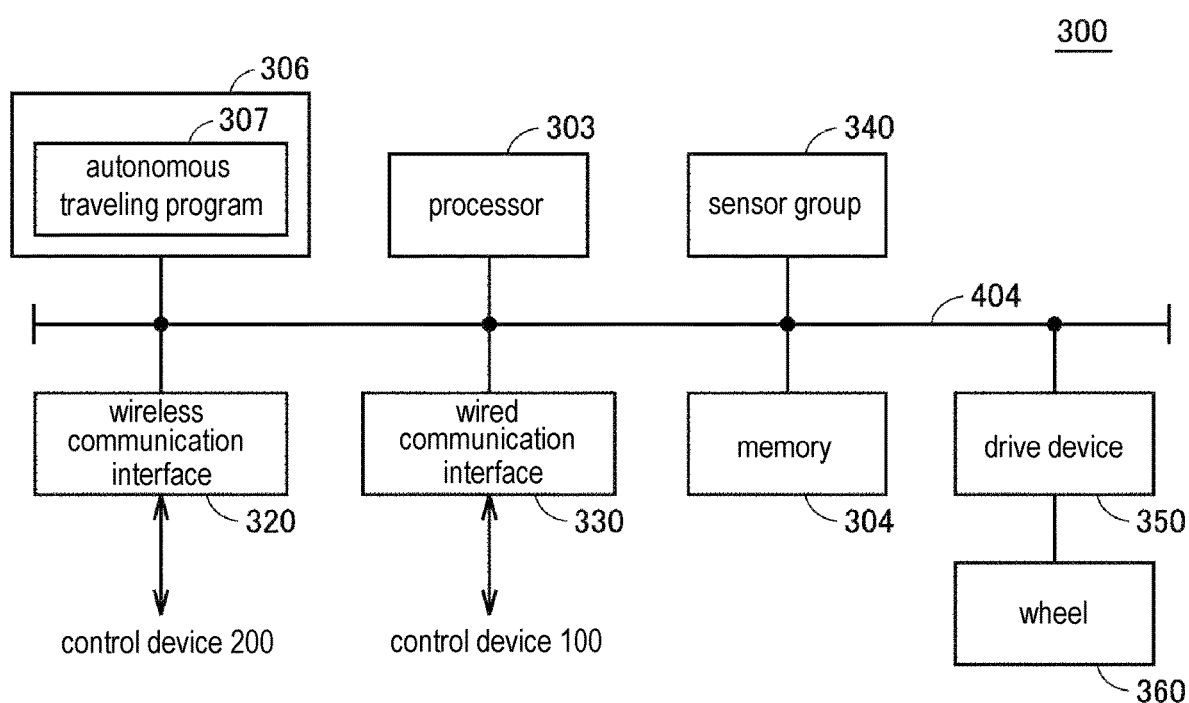
FIG. 3 is a block diagram illustrating a hardware configuration example of a moving mechanism included in the moving system according to the present embodiment.

FIG. 3 is a block diagram illustrating a hardware configuration example of the moving mechanism included in the moving system according to the present embodiment. With reference to FIG. 3, the moving mechanism 300 includes, as main components, a processor 303, a memory 304, a storage 306, a wireless communication interface 320, a wired communication interface 330, a sensor group 340, and a drive device 350. These components included in the moving mechanism 300 are communicably connected to each other via an internal bus 404.

The processor 303 realizes various processes by reading and executing various programs stored in the storage 306. The memory 304 includes a volatile storage device such as a DRAM or an SRAM. The storage 306 stores an autonomous traveling program 307 for performing autonomous driving.

The wireless communication interface 320 controls exchange of data via a wireless network. The wireless communication interface 320 of the present embodiment controls exchange of data with the control device 200.

The wired communication interface 330 controls exchange of data via a wired network. The wired communication interface 330 of the present embodiment controls exchange of data with the control device 100.

The sensor group 340 includes various sensors such as a sensor (for example, a laser scanner or a global positioning system (GPS) sensor) for specifying the current position of the moving mechanism 300, a laser sensor for detecting an obstacle around the moving mechanism 300, and a contact sensor for detecting contact with an object.

The drive device 350 is a device for driving wheels 360, and includes an actuator such as a motor.

D. Hardware Configuration Example of Control Device 200 and Field Apparatus 500

Next, a hardware configuration of the control device 200 and the field apparatus 500 fixedly installed on the production line will be described.

Figure 4:
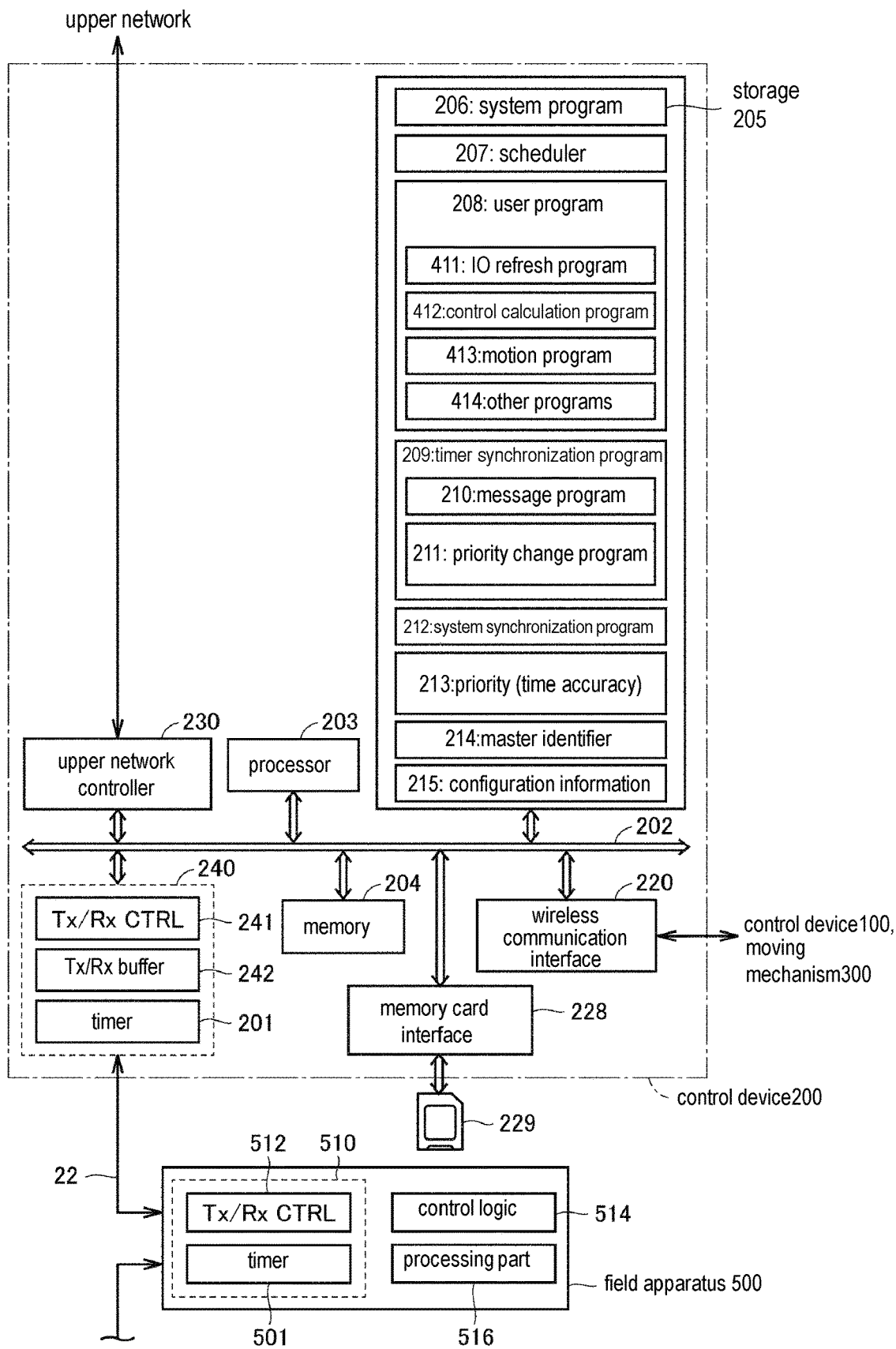
FIG. 4 is a block diagram illustrating a hardware configuration example of a control device and a field apparatus fixedly installed on a production line according to the present embodiment.

FIG. 4 is a block diagram illustrating a hardware configuration example of a control device and a field apparatus fixedly installed on the production line according to the present embodiment. The control device 200 may typically be configured on the basis of a PLC. The control device 200 can operate as a master that manages the data transmission of the field network 22. The field apparatus 500 may operate as a slave that transmits data according to a command from a corresponding master.

With reference to FIG. 4, the control device 200 includes, as main components, a processor 203, a memory 204, a storage 205, a wireless communication interface 220, a memory card interface 228, an upper network controller 230, and a field network controller 240. These components included in the control device 200 are communicably connected to each other via an internal bus 202.

Since the memory 204 and the storage 205 respectively have the same storage media as those of the memory 104 and the storage 105 in FIG. 2, the description thereof will not be repeated.

The storage 205 stores the same programs and data as those in the storage 105 illustrated in FIG. 2. Specifically, the storage 205 stores a system program 206 including an OS and an application program designed according to the control system 1 or a control target. The processor 203 executes the application program under the control of the system program 206.

The application program includes a scheduler 207, a user program 208, a timer synchronization program 209, a system synchronization program 212 for performing a time synchronization process between the devices of the control system 1, and the like. The storage 205 further stores a priority 213, a master identifier 214, and a configuration information 215. The priority 213 is information indicating the time accuracy of the timer 201 included in the control device 200. The master identifier 214 is information for identifying a control device having a timer that is a grand master in a network configuration to which the control device 200 is connected. The configuration information 215 is information indicating a network configuration to which the control device 100 is connected, and includes, for example, information regarding a control device including an identifier of the control device connected to the network configuration, information regarding a field apparatus, and the like.

The user program 208 includes an IO refresh program 411 for the above IO refresh process, a control calculation program 412 for the control calculation process, a motion program 413, and other programs 414 for other processes.

The control calculation program 412 includes, for example, a ladder program for outputting a control command for controlling movement of a conveyor or a stage that conveys a workpiece.

The motion program 413 includes a robot program or the like for calculating a behavior of a robot that is a control target. A virtual axis is correlated with the arm of the robot, and a behavior such as a position and a posture of the robot are determined from a position of each axis. Specifically, the motion program 413 outputs a control command for giving an instruction for a speed and a trajectory of movement of each arm according to a target position changing in time series such that a behavior of the robot indicates a behavior that is a target (hereinafter, also referred to as a target behavior).

Since the other programs 414 perform the same processes as those of the other programs 404, the description thereof will not be repeated.

The timer synchronization program 209 includes instruction codes for realizing the timer synchronization process described above. Specifically, the timer synchronization program 209 includes a message program 210 for performing communication of an announcement message when a timer of a grand master is selected from the network configuration to which the control device 100 is connected, and a priority change program 211 for temporarily changing (rewriting) the priority 213.

The wireless communication interface 220 controls exchange of data via a wireless network. The wireless communication interface 220 of the present embodiment controls exchange of data with the control device 100 or the moving mechanism 300 included in the moving system 10.

The memory card interface 228 is configured as an interface to and from which a memory card 229 is attachable and detachable, and can thus write data into the memory card 229 and read various data (user programs, trace data, and the like) from the memory card 229. The memory card 229 is a small storage medium, and includes, for example, a flash memory, and specifically includes an SD card or the like.

The upper network controller 230 provides an interface for the control device 200 to exchange data with other control devices via the network 22. As a protocol of the network 23, EtherNet/IP (registered trademark) that is an industrial open network in which a control protocol is installed on general-purpose Ethernet (registered trademark) may be used.

The field network controller 240 provides an interface for the control device 200 to exchange data with the field apparatus 500 via the field network 22. As a protocol of the field network 22, EtherCAT (registered trademark) that is an example of a machine control network may be employed.

In the same manner as the field network controller 140 illustrated in FIG. 2, the field network controller 240 has, as main components, a transmission/reception controller 241 (abbreviated to a Tx/Rx CTRL 241 in the figure), a transmission/reception buffer 242 (abbreviated to a Tx/Rx buffer 242 in the figure), and a timer 201 that manages time having a certain accuracy. Since the functions of these components are the same as the functions of the corresponding components of the field network controller 140 illustrated in FIG. 2, the detailed description thereof will not be repeated.

Therefore, the transmission/reception controller 241 corresponds to an example of a "communicator" for transmitting a control command to the field apparatus 500 that is a control target corresponding to the control device 200 with time managed by the timer 201 as a reference.

The field apparatus 500 performs a process on a control target such as a machine or a facility under the control of the control device 200. Typically, the field apparatus 500 performs a process of collecting field information from a control target, a process of outputting a command signal to the control target, and the like.

The field apparatus 500 includes, as main components, a field network controller 510, a control logic 514 for managing data transfer on the field network 22, and a processing part 516. The field network controller 510 includes a transmission/reception controller 512 (abbreviated to a Tx/Rx CTRL 512 in the figure) and a timer 501 as main components. The timer 501 is time-synchronized with the timer 201 with the timer 201 as a master. Since the functions of these components are the same as the functions of the corresponding components of the field apparatus 400 illustrated in FIG. 2, the detailed description thereof will not be repeated.

E. Processing Module Configuration

Figure 5:
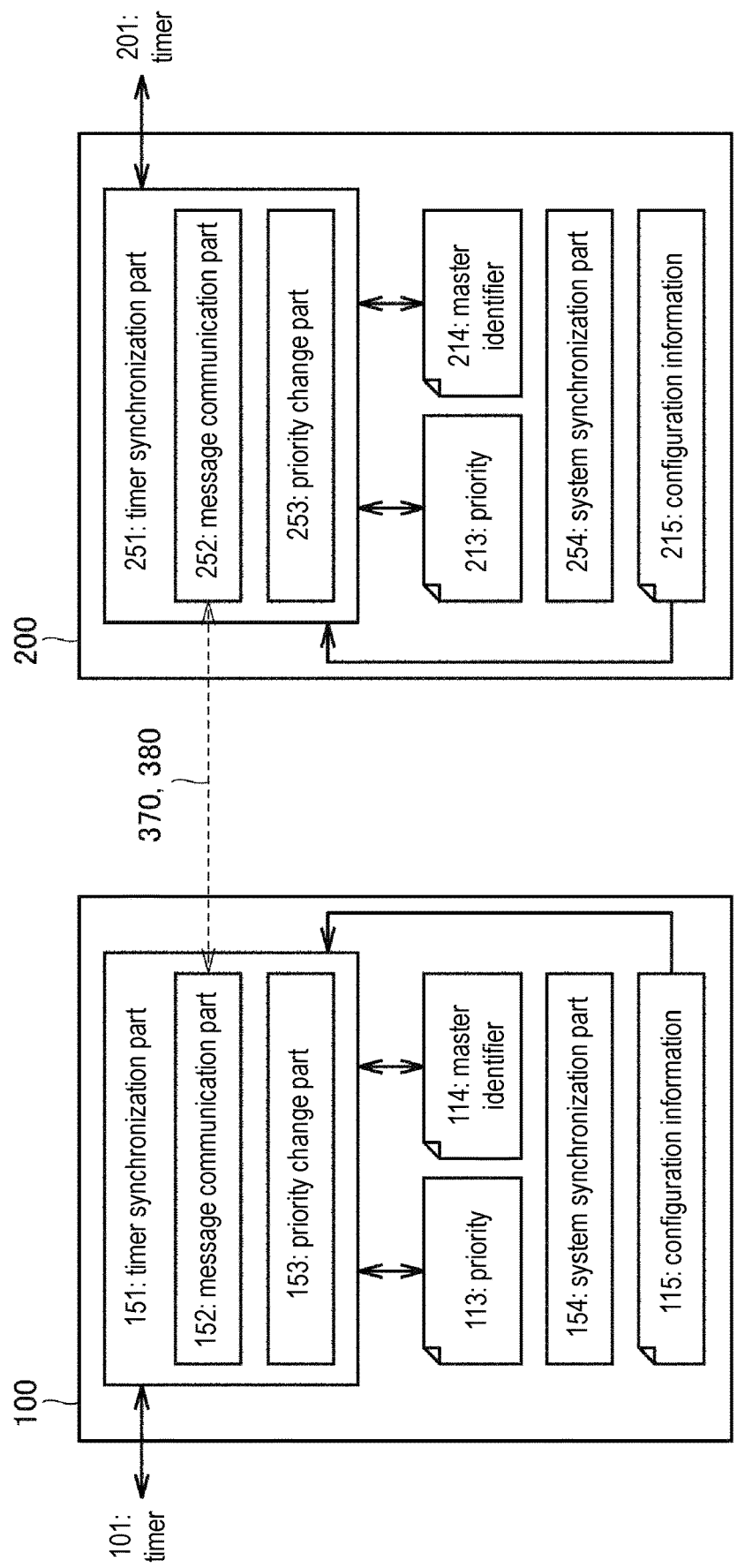
FIG. 5 is a diagram schematically illustrating an example of a configuration of a processing module according to an embodiment of the present invention.

FIG. 5 is a diagram schematically illustrating an example of a configuration of a processing module according to the embodiment of the present invention. FIG. 5 generally illustrates modules related to the timer synchronization process, and modules and data related thereto. The modules illustrated include a module provided by the processor 103 or processor 203 included in the control device 100 in FIG. 2 and the control device 200 in FIG. 4 executing a program.

With reference to FIG. 5, the control device 100 of the moving system 10 includes a timer synchronization part 151 corresponding to the timer synchronization program 109 and a system synchronization part 154 corresponding to the system synchronization program 112. The timer synchronization part 151 is an example of a "timer synchronizer" and includes a message communication part 152 corresponding to the message program 110 and a priority change part 153 corresponding to the priority change program 111. The message communication part 152 performs communication of an announcement message 370 that will be described later. The priority change part 153 temporarily changes the priority 113. The announcement message 370 includes the priority 113 of a control device that is a transmission source of the announcement message 370 and an identifier of the control device that is a transmission source in the configuration information 115.

The control device 200 includes a timer synchronization part 251 corresponding to the timer synchronization program 209 and a system synchronization part 254 corresponding to the system synchronization program 212. The timer synchronization part 251 is an example of a "timer synchronizer" and includes a message communication part 252 corresponding to the message program 210 and a priority change part 253 corresponding to the priority change program 211. The message communication part 252 performs communication of an announcement message 380 that will be described later. The priority change part 253 temporarily changes the priority 213.

The announcement message 380 includes the priority 213 of a control device that is a transmission source of the announcement message 380 and an identifier of the control device that is a transmission source in the configuration information 215.

F. Scene to Which Timer Synchronization Process is Applied

In the present embodiment, one or more control devices connected to a network configuration of a production line may be classified into a work support system and a work continuation system. The work continuation system indicates a system (control device) that continues to operate so as not to stop work even in a case where the network configuration to which an own device is connected is changed. Here, "operation" means a state in which the control device controls a target field apparatus by performing a refresh process, a control calculation process, and a motion process in a control cycle synchronized with time of the timer. The work support system indicates a system (control device) that operates in cooperation with the work continuation system in order to support the work continuation system that is in operation such that the work can be performed.

In the control device, as a method for identifying whether the own device is the work support system or the work continuation system, for example, the control device has a variable for defining whether the own device is the work support system or the work continuation system. The control device refers to the variable to autonomously detect whether the own device is the work support system or the work continuation system. A user may define the variable at the time of designing the user program 108 (208).

Alternatively, when the control device has a program mode (a state in which the user program 108 (208) is not executed) and a run mode (a state in which the user program 108 (208) is executed) as a state thereof, and performs time synchronization, the control device detects that the own device is the work support system when the own device is in the program mode, and detects that the own device is the work continuation system when the own device is in the run mode.

In a case where the work support system is connected to a network configuration of the work continuation system as described above, if a timer of the work continuation system is suddenly synchronized with a timer of the work support system with higher accuracy, for example, this may influence a behavior of the robot performed by the motion program 413 of the work continuation system. That is, since a target behavior is calculated according to a target position that changes in a time series described above in a control cycle synchronized with time of the timer, if the time of the timer varies significantly, there is a probability that a behavior of the robot calculated in the original control cycle greatly deviates relative to the target behavior. Therefore, in the present embodiment, in a case where the network configuration is changed, the timer synchronization process is performed such that such a trouble is avoided.

Figure 6:
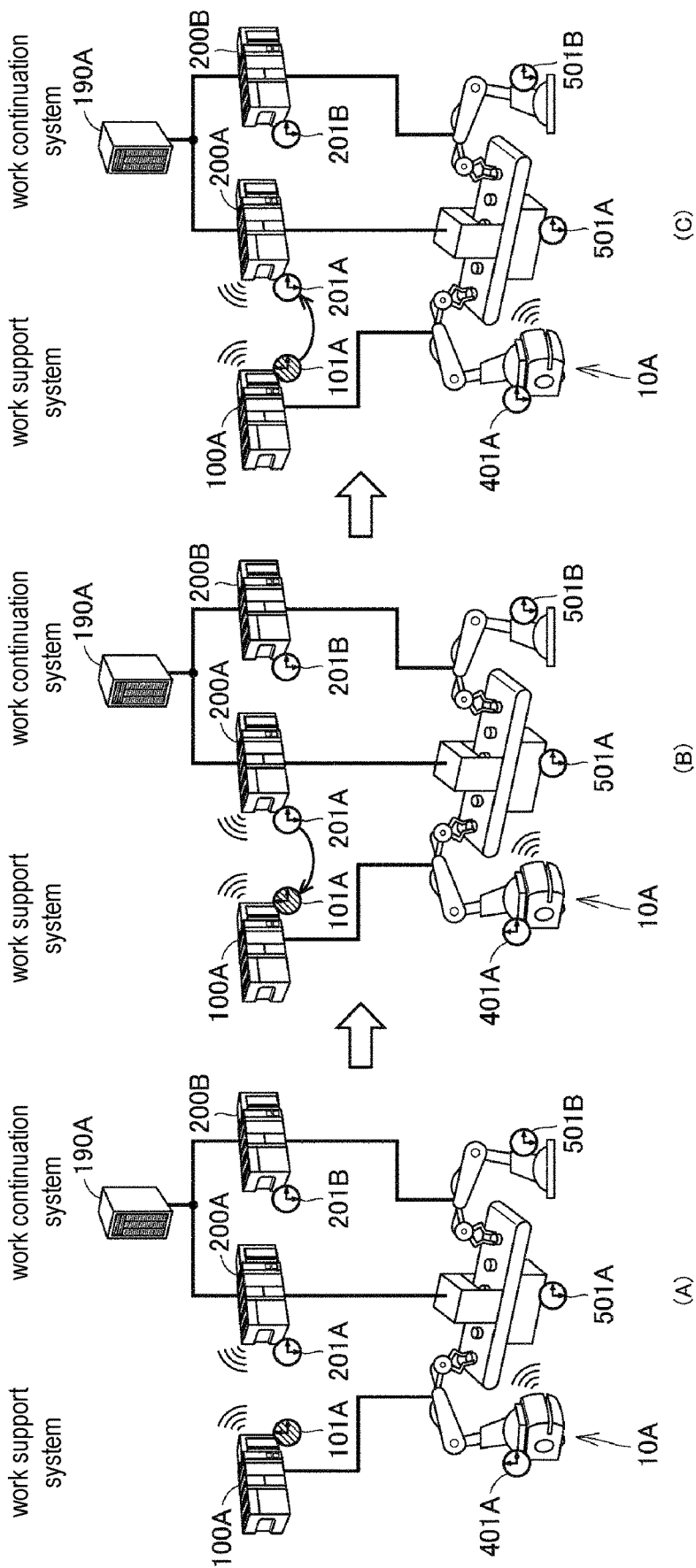
FIG. 6 is a diagram schematically illustrating a scene to which a timer synchronization process according to an embodiment of the present invention is applied.

FIG. 6 is a diagram schematically illustrating a scene to which the timer synchronization process according to the embodiment of the present invention is applied. In a scene in (A) of FIG. 6, the moving system 10A moves to the work continuation system, and the control device 100A is connected to a network configuration of the work continuation system as the work support system, and thus the network configuration is changed. The control device of the work support system temporarily stops (interrupts) work (operation) when it is connected to the network configuration of the work continuation system, that is, when the network configuration is changed. In a case where the network configuration is changed as described above, first, it is determined whether or not the timer synchronization process is to be executed in the changed network configuration. Specifically, in the changed network configuration, when it is determined that a timer having the highest accuracy is not provided in the work continuation system, the timer synchronization process is executed.

In (A) of FIG. 6, for example, a relationship between the priority 113 of the timer 101A of the control device 100A and the priority 213 of the timers 201A and 201B of the control devices 200A and 200B of the work continuation system is (the priority 113>the priority 213), and thus a priority of priority 113 is higher. Therefore, the following timer synchronization process is performed.

In the changed network configuration in (A) of FIG. 6, the work support timer 101A is selected as the best timer having the highest accuracy.

Thereafter, as illustrated in (B) of FIG. 6, a timer (the timer 201A in (B) of FIG. 6) having the highest accuracy among the timers of the work continuation system temporarily functions as a grand master, and the best timer 101A of the work support system is time-synchronized with the temporary grand master (timer 201A) of the work continuation system.

When the time synchronization is completed in (B) of FIG. 6, the grand master is then switched to the timer 101A of the work support system as illustrated in (C) of FIG. 6. That is, the best timer 201A of the work continuation system is synchronized with the time of the timer 101A of the work support system.

According to the timer synchronization process in FIG. 6, in a case where the network configuration is changed, the timer synchronization process described above is executed, and thus the timer of the work continuation system can be time-synchronized in stages with the timer having higher accuracy of the work support system. Consequently, the timer of the work continuation system can be time-synchronized with the grand master (timer 101A) of the work support system while continuing the work without causing any trouble in the above motion control.

G. Flowchart

Figure 7:
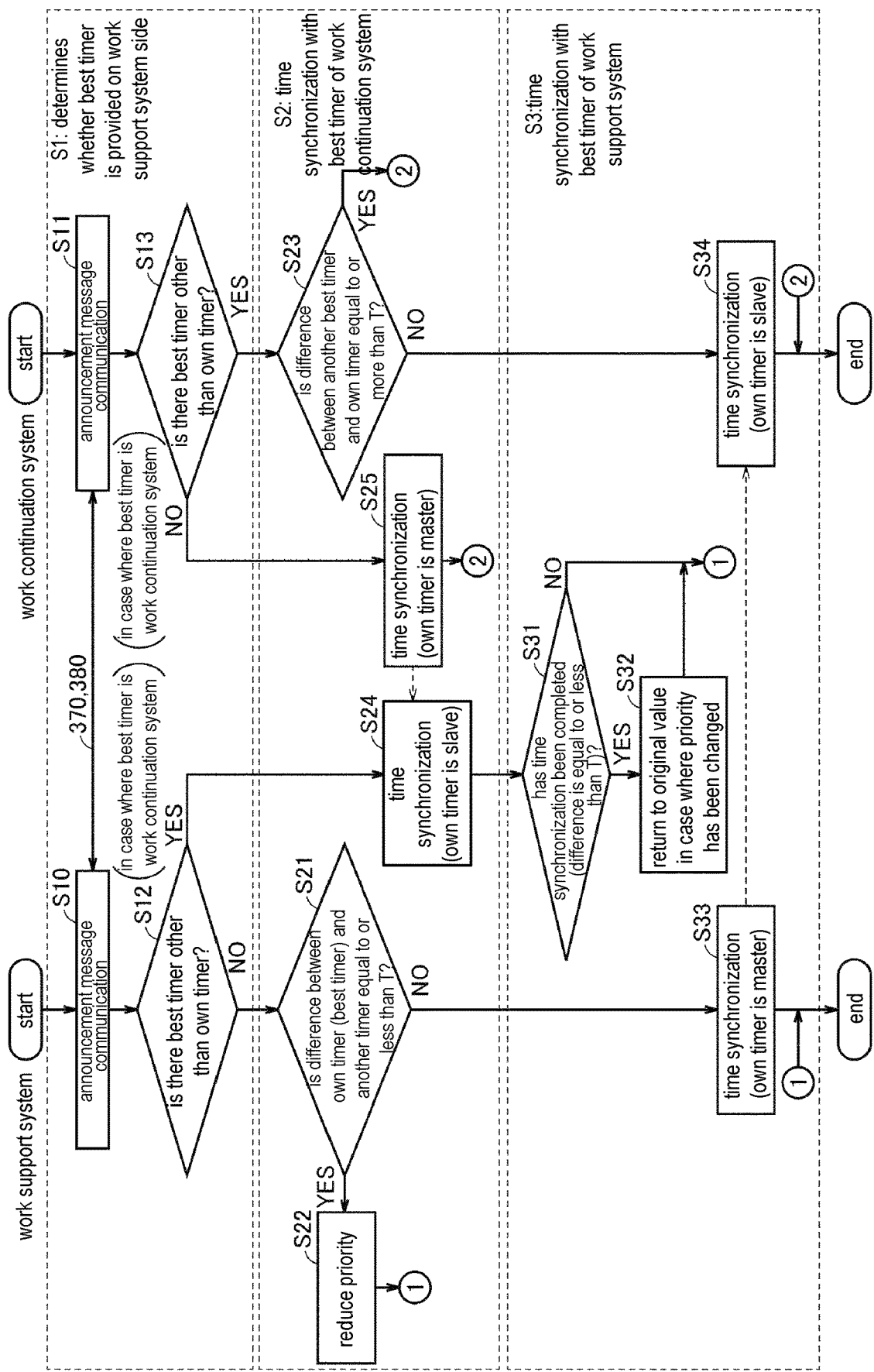
FIG. 7 is a diagram illustrating an example of a flowchart related to the timer synchronization process according to the embodiment of the present invention.

FIG. 7 is a diagram illustrating an example of a flowchart related to the timer synchronization process according to the embodiment of the present invention. An example of a process in a case where the network configuration in FIG. 6 is changed is illustrated. In FIG. 7, a process of determining whether the work support system has the best timer (step S1 (steps S10 to S13)), a process of setting the best timer on the work continuation system side and synchronizing the time (step S2 (steps S21 to S25)), and a process of setting the best timer on the work support system side and synchronizing the time (step S3 (steps S31 to S34)) are performed. The processes in FIG. 7 are repeatedly executed.

First, in step S1, in a case where the work support system is connected to the network configuration of the work continuation system, the moving system 10A of the work support system moves to the work continuation system while the message communication part 152 transmits the announcement message 370. The announcement message 370 includes identification information for identifying the control device 100 that is a transmission source and the priority 113. The timer synchronization part 151 extracts the identification information of the control device 100 from the configuration information 115. Upon receiving the announcement message 370, the message communication part 215 of the control device 200 of the work continuation system executes a communication procedure for establishing a communication link between the control device 100 and the control device 200.

The timer synchronization part 251 of the control device 200 collates the identification information of the control device 100 in the received announcement message 370 with the configuration information 215, and determines that the control device 100 is not registered in the network configuration of the production line 2A on the basis of a collation result. Consequently, the timer synchronization part 215 can detect that there is a change of the network configuration, that is, that the control device 100 is added to the network configuration. A method of detecting whether or not the network configuration is changed is not limited to this.

In a case where a change of the network configuration is detected, the message communication part 152 of the control device 100 of the work support system transmits the announcement message 370 (step S10), and the message communication part 252 of the control device 200 (for example, the control device 200A) of the work continuation system transmits the announcement message 380 (step S11). The announcement message 380 includes identification information for identifying the control device 200 that is a transmission source and the priority 213. The timer synchronization part 251 extracts the identification information of the control device 200 from the configuration information 215.

The timer synchronization part 151 compares the priority 213 in the received announcement message 380 with the priority 113 of the own device, and determines whether or not there is the best timer other than the timer 101A that is a timer of the own device (abbreviated to an own timer in FIG. 7) in the changed network configuration on the basis of a result of the comparison (step S12). Specifically, when it is determined that the condition (priority 113<priority 213) is satisfied, that is, when it is determined that a priority of the priority 213 is higher, the timer synchronization part 151 detects that there is the best timer (the timer 201A of the work continuation system) other than the timer 101A (YES in step S12), and proceeds to step S24.

On the other hand, when it is determined that the condition of (priority 113<priority 213) is not satisfied, that is, it is determined that (priority 113>priority 213) and a priority of the priority 113 is higher, the timer synchronization part 151 detects that there is no best timer other than the timer 101A (NO in step S12), and proceeds to step S21.

The timer synchronization part 251 compares the priority 113 in the received announcement message 370 with the priority 213 of its own device, and determines whether or not there is the best timer other than the timer 201A in the changed network configuration on the basis of a result of the comparison (step S13). Specifically, when it is determined that the condition (priority 213>priority 113) is satisfied, that is, when it is determined that a priority of the priority 213 is higher, the timer synchronization part 251 detects that there is no best timer other than the timer 201A (NO in step S13), and proceeds to step S25.

On the other hand, when it is determined that the condition (priority 213>priority 113) is satisfied, that is, when it is determined that a priority of the priority 213 is higher, the timer synchronization part 251 detects that there is no best timer other than the timer 201A (YES in step S13), and proceeds to step S23.

The time synchronization process in step S2 will be described. Specifically, in steps S24 and S25, the timer synchronization part 151 sets the timer 101A as a slave, the timer synchronization part 251 sets the timer 201A as a master, and the slave timer 101A is time-synchronized with the master timer 201A (steps S24 and S25). Time synchronization means matching time of timer 101A with time of timer 201A.

In step S21, the timer synchronization part 151 of the control device 100 of the work support system compares the time of the timer 101A with the time of the timer 201A received from the timer synchronization part 251, and determines whether or not a difference between the two is equal to or more than a threshold value T on the basis of a result of the comparison (step S21). When it is determined that the difference between the two is less than the threshold value T (NO in step S21), the process proceeds to step S3. On the other hand, when it is determined that the difference between the two is equal to or more than the threshold value T (YES in step S21), the priority change part 153 temporarily changes the priority 113 to a value lower than the priority 213 of the best timer 201A of the work support system (Step S22), and finishes the process. Thereafter, in step S10, the announcement message 370 having the priority 113 set to a low value can be transmitted.

In step S23, the timer synchronization part 251 of the control device 200 of the work continuation system compares the time of the timer 201A with the time of the timer 101A received from the timer synchronization part 151, and determines whether or not a difference between the two is equal to or more than the threshold value T on the basis of a result of the comparison (step S23). When it is determined that the difference between the two is equal to or more than the threshold value T (YES in step S23), the process is finished, but when it is determined that the difference between the two is less than the threshold value T (NO in step S23), the process proceeds to step S3.

The time synchronization process in step S3 will be described. The timer synchronization part 151 determines whether or not the time synchronization process (steps S24 and S25) in step S2 has been finished (step S31). Specifically, when the timer synchronization part 151 determines whether the difference between the time of the timer 101A and the time of the timer 201A is equal to or less than the threshold value T (step S31), and determines that the difference is more than the threshold value T (NO in step S31), the process is finished.

When the timer synchronization part 151 determines that the difference between the time of the timer 101A and the time of the timer 201A is equal to or less than the threshold value T (YES in step S31), that is, when it is detected that the time synchronization has been finished, the priority change part 153 sets the priority 113 to an original value in a case where a value of the priority 113 has been changed (step S32), and then the process is finished. Consequently, when the time synchronization is finished, the priority 113 of which the value has been temporarily changed in step S22 is returned to the original value.

When it is determined that the time difference between the best timer 101A and the other timer 201A is less than the threshold value T (NO in step S21 and NO in step S23), the process of synchronizing the time of the timer 101A with the timer 201A (steps S24 and S25) is skipped (not performed), and the timer 201A is time-synchronized with the best timer 101A (steps S33 and S34). Specifically, the timer synchronization part 151 sets the timer 101A as a master, the timer synchronization part 251 sets the timer 201A as a slave, and the slave timer 201A is time-synchronized with the master timer 101A (steps S33 and S34). Thereafter, the process is finished.

In FIG. 7, by exchanging the announcement messages 370 and 380 between the work continuation system and the work support system, when a communication link is established between the two, the control devices 100 and 200 autonomously detects that the network configuration has been changed. A method of detecting a change of the network configuration is not limited to the method of autonomously detecting a change of the network configuration, and the change of the network configuration may be detected on the basis of an instruction from another device.

(g1. Modification Example of Flowchart)

Figure 8:
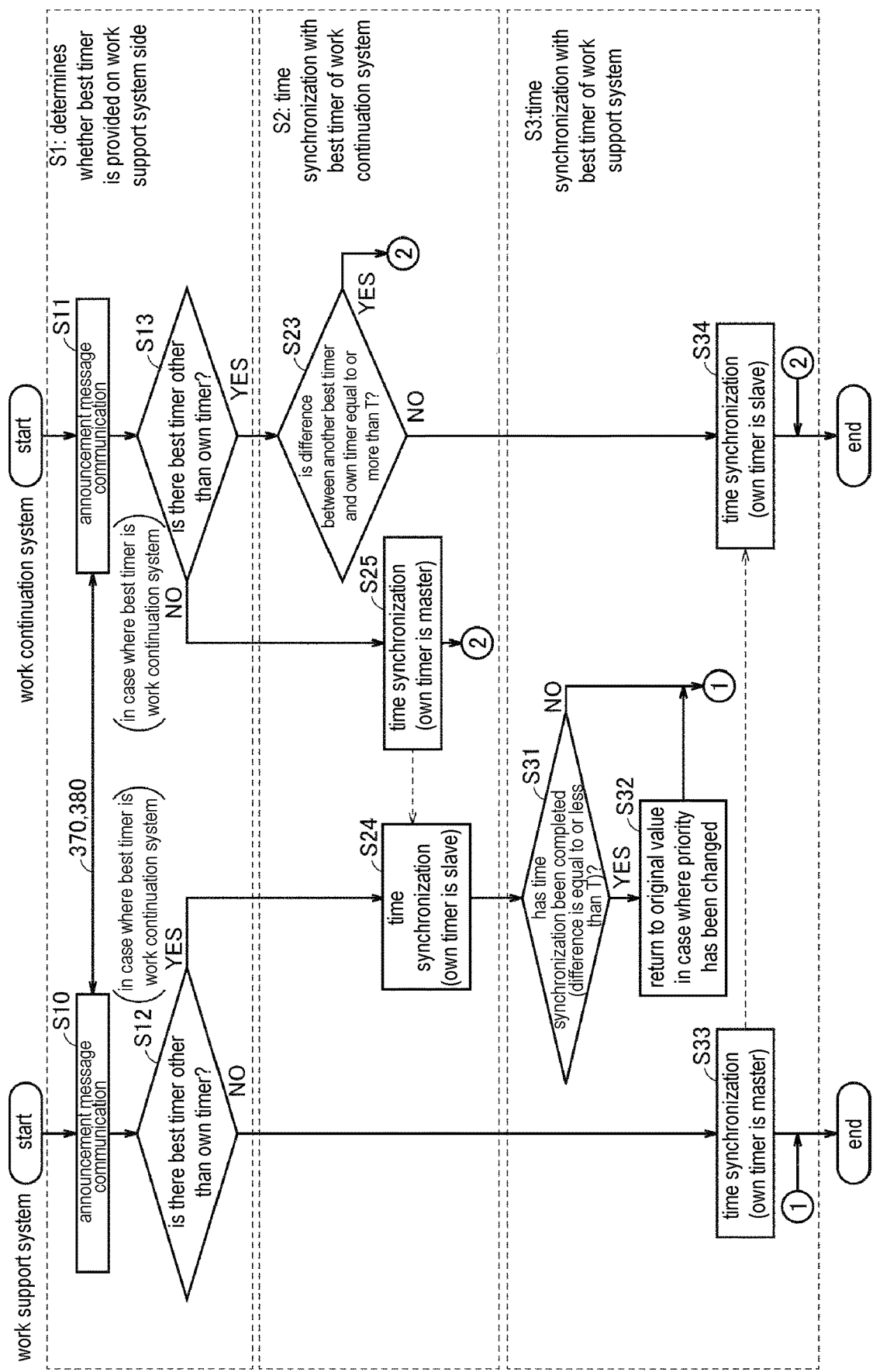
FIG. 8 is a diagram illustrating a modification example of the flowchart of FIG. 7.

FIG. 8 is a diagram illustrating a modification example of the flowchart of FIG. 7. In FIG. 8, the processes of steps S21 and S22 of FIG. 7 are omitted, but the other processes are the same as those of FIG. 7, and the description thereof will not be repeated.

In FIG. 7, by performing communication of the announcement messages 370 and 380 to establish a communication link, each of the control device 100 and the control device 200 detects that the network configuration has been changed. In contrast, in FIG. 8, each of the control device 100 of the work support system and the control device 200 of the work continuation system receives a network configuration change instruction from the outside such as the management device 190. This change instruction includes an instruction for reducing the priority 113 of the timer 101A.

When the control device 100 of the moving system 10A receives the above change instruction, the moving system 10A moves to the work continuation system according to the received change instruction, and in the process of moving, the priority change part 153 reduces the priority 113 to a predetermined value. The predetermined value is a value lower than the priority 213. Thereafter, the process in step S1 is performed.

As described above, in the process of moving the moving system 10A to the work continuation system, the priority change part 153 can omit the processes of steps S21 and S22 in FIG. 7 when lowering the priority 113 to a predetermined value.

According to the timer synchronization process in FIG. 7 or 8, in a case where the time of the timer 201A of the work continuation system is synchronized with the time of the timer 101A (grand master) having the highest accuracy when the network configuration is changed, time synchronization can be performed in multiple stages. Specifically, in steps S24 and S25, the timer 201A of the work continuation system is temporarily set as a grand master to synchronize the time of the entire control system 1 with the time of the temporary grand master (time synchronization in a first stage). Thereafter, in steps S33 and S34, the timer 101A of the work support system having the highest accuracy is set as a grand master, and the timer of the control system 1 is time-synchronized with the grand master having the high accuracy (time synchronization in a second stage).

Therefore, even if a difference between the time of a timer before the network configuration change and the time of a new grand master selected after the network configuration change is great, time synchronization is performed in multiple stages, and thus the timer of the control system 1 can be time-synchronized with the new grand master without causing the above trouble in the control for the field apparatus of the work continuation system as described above.

(g2. Timer Time Synchronization Method)

In the process of time synchronization in steps S24 and S25, time synchronization may be gradually performed. Specifically, the timer synchronization part 151 may calculate an amount of synchronization deviation, that is, a time difference between a grand master and the timer 101A, on the basis of time information from the timer 201A temporarily set as the grand master and time information of the timer 101A, divide the calculated difference into N (where N≥2) values, and periodically and cumulatively add or subtract (increment or decrement) each value Di of the divided values Di (where i=1, 2, 3, . . . , and N) to or from a value of the timer 101A. Consequently, the addition is repeated N times, and the value of the timer 101A can be gradually (smoothly) changed. The value of N or the value Di may be variable. For example, the value of N or the value Di may be variable on the basis of a magnitude of the difference.

Similarly, in the time synchronization process in steps S33 and S34, the time synchronization may be gradually performed. Specifically, the timer synchronization part 251 calculates a time difference between a grand master and the timer 201A on the basis of time information from the timer 101A set as the grand master and time information of the timer 201A, divides the calculated difference into N (where N≥2) values, and uses the divided value Di (where i=1, 2, 3, . . . , and N) as an adjustment amount for updating the time of the timer 201A in time adjustment. That is, each value Di may be periodically and cumulatively added or subtracted (incremented or decremented) to or from a value of the timer 201A to gradually synchronize the time. Consequently, the addition is repeated N times, and the value of the timer 201A can be gradually (smoothly) changed.

A cycle for this time synchronization may be synchronized with a control cycle. In this case, the timer 201A of the work continuation system may be gradually synchronized with the grand master by applying N control cycles.

Such time synchronization over N control cycles may be performed in combination with the time synchronization in multiple stages described above.

H. System Sychronization Process

When the timer synchronization process is performed as described above, a system synchronization process is performed in order to time-synchronize the timer provided in each device of the control system 1 with a grand master.

Specifically, the system synchronization part 154 of the control device 100 determines whether or not the timer 101 thereof is set as a grand master on the basis of the master identifier 114. The system synchronization part 254 of the control device 200 of the control system 1 determines whether or not the timer 201 thereof is set as a grand master on the basis of the master identifier 214. For example, in a case where it is determined that the timer 101A of the control device 100 is set as a grand master, the system synchronization part 154 uses the timer 101A as a reference to perform a process or the like of adjusting the timers of another control device 200 and the field apparatus 401A in order to synchronize the time with another control device 200 and the field apparatus 401A. Alternatively, in a case where the timer 201A of the other control device 200 is set as a grand master, the system synchronization part 254 uses the timer 201A as a reference to perform a process of adjusting the timer 101A of another control device 100 and the timer 501A of the field apparatus 500A.

The control device 200 time-synchronizes a timer of another control device (for example, the control device 200B) of the work continuation system and a timer of a field apparatus (for example, the field apparatus 500B) with the timer 201A.

I. Other Examples of Network Configuration Change

Figure 9:
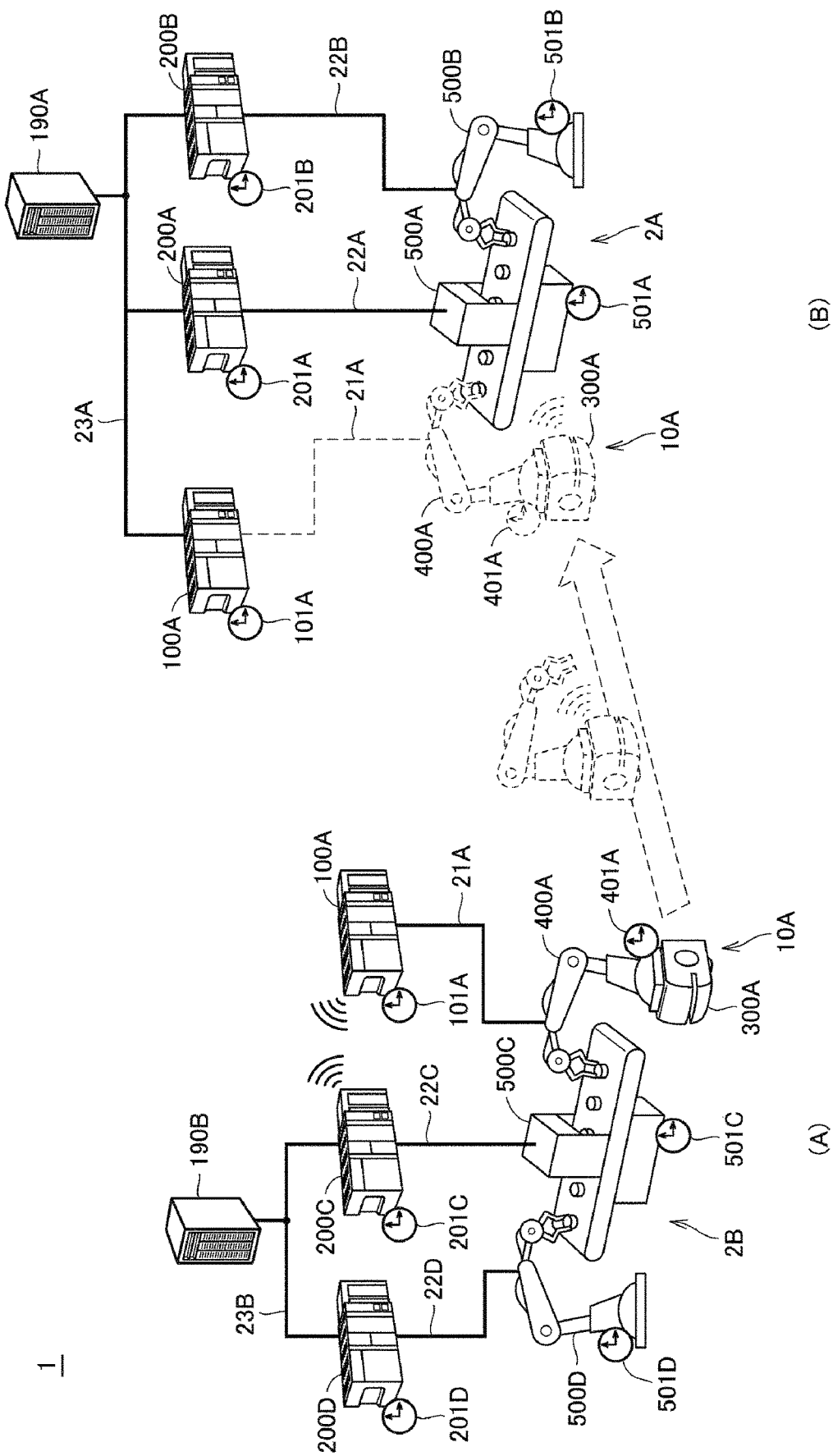
FIG. 9 is a diagram schematically illustrating another example of changing a network configuration according to the present embodiment.
Figure 10:
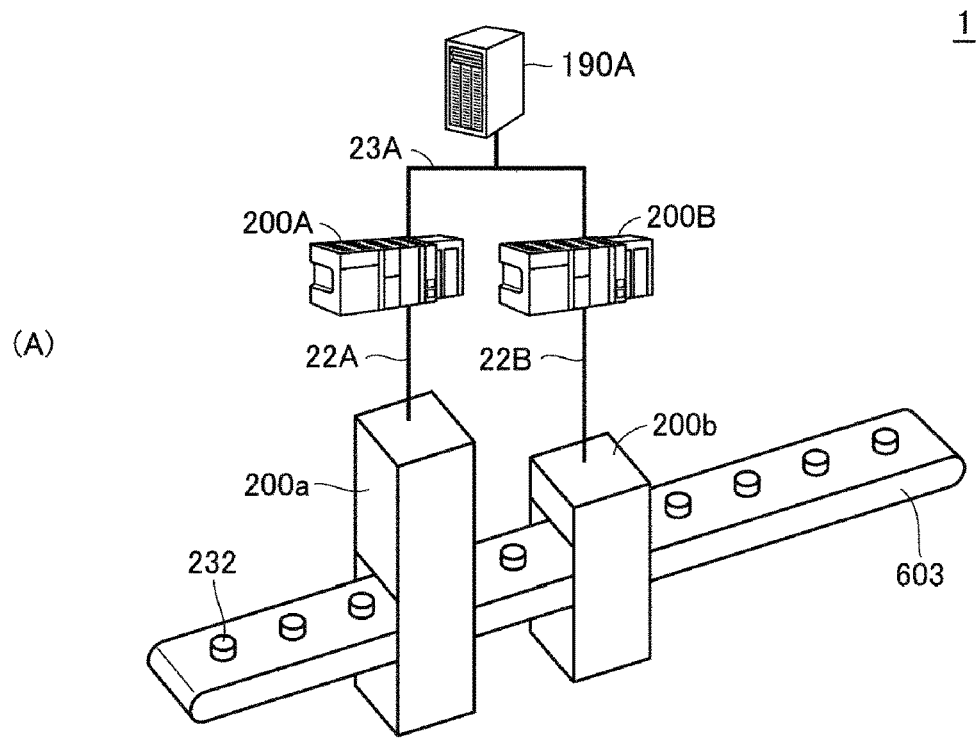
FIG. 10 is a diagram schematically illustrating still another example of changing a network configuration according to the present embodiment.
Figure 10:
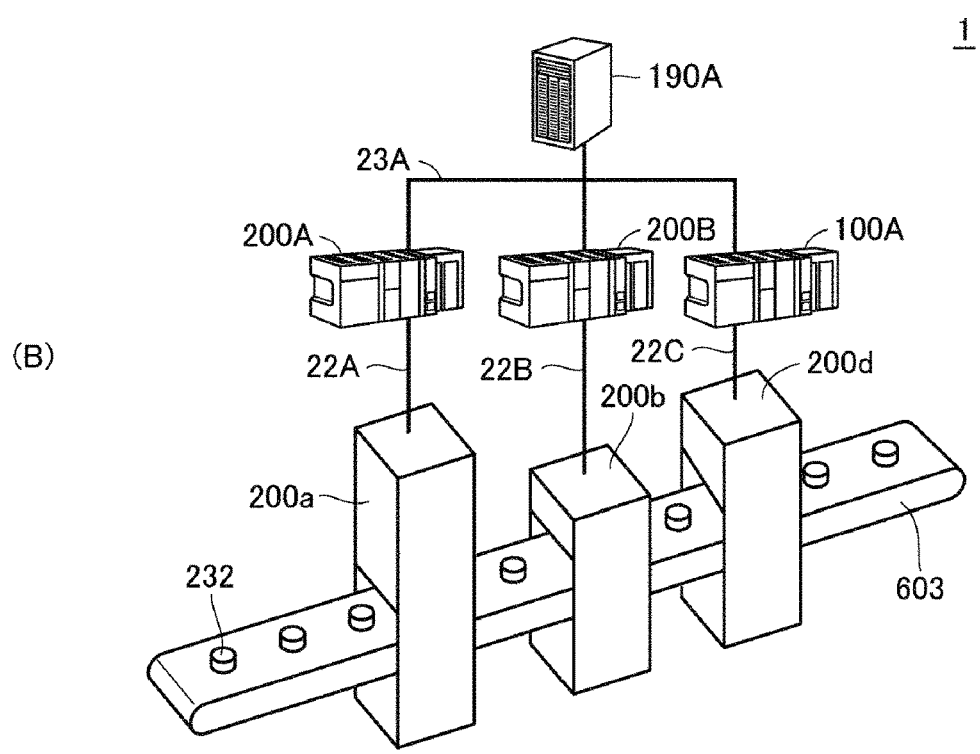

FIGS. 9 and 10 are schematic diagrams respectively illustrating other examples of changes of the network configuration according to the present embodiment. In FIG. 1, the control device 100A also moves with movement of the moving system 10A, but in (B) of FIG. 9, the control device 100A is connected in advance to the network 23A of the work continuation system. However, the control device 100A is not operating in the work continuation system. In a case where the moving system 10A of work support system in (A) of FIG. 9 moves to the work continuation system, only the field apparatus 401A is moved by the moving mechanism 300A.

When the moving system 10A moves to the work continuation system and is communicably connected to the control device 100A, the control device 100A of the work support system is started. Thereafter, the process in step S1 (FIG. 7) is executed. Each of the control device 100A and the control device 200A detects that the network configuration has been changed.

FIG. 10 illustrates an example in which the control system 1 is applied to a production line that performs processing on a workpiece 232 conveyed by a conveyance belt 603.

With reference to (A) of FIG. 10, in the production line, after a field apparatus 200a connected to the control device 200A performs processing on the workpiece 232, a field apparatus 200b connected to the control device 200B performs another processing on the workpiece 232.

It is assumed that additional processing is required on the workpiece 232 due to a change of the type of manufactured product. In this case, a field apparatus 200D for performing the additional processing and the control device 100A connected to the field apparatus 200D via the field network 22C are introduced into the production line ((B) of FIG. 10). When the control device 100A is connected to the network 23A of the work continuation system, the process in step S1 (FIG. 7) is subsequently executed. The control device 100A and the control device 200A each detect that the network configuration has been changed.

In the above embodiment, as an example of a network configuration change, a case where a control device is additionally connected to the network 23A has been described, but the present embodiment may also be applied to a case of a network configuration change in which a control device is disconnected from the network 23A. Specifically, a plurality of control devices 200 connected to the network 23A after being changed due to disconnection of the control device performs a timer synchronization process (a process of detecting (selecting) a grand master and time-synchronizing other timers with the grand master). Consequently, even if a timer of the disconnected control device is a grand master, a timer time synchronization process using a new grand master can be performed in a changed network configuration.

J. Program

The processor 103 of the control device 100 controls each constituent of the control device 100 by executing a program for the timer synchronization process. The storage 105 may store such a program and data related to such a timer synchronization process.

The processor 203 of the control device 200 controls each component in the control device 200 by executing a program for timer synchronization process. The storage 205 may store programs and data related to such timer synchronization process.

The storages 105 and 205 are not limited to HDDs or SSDs. Specifically, the storages 105 and 205 are medium that accumulate information such as a program recorded thereon through electrical, magnetic, optical, mechanical, or chemical action such that the information such as a program can be read by other devices including a computer such as a processor, a machine, or the like.

The program or data related to the timer synchronization process may be downloaded to the storages 105 and 205 via various communication lines including the networks 23A and 23B or via the memory cards 129 and 229.

K. Advantages

According to the present embodiment, in a case where a network configuration of the control system 1 is changed, a grand master is detected (selected) from timers provided in the changed network configuration, and all the timers provided in the network configuration are time-synchronized with the grand master. Consequently, even if the network configuration is changed, timers of the network configuration can always be time-synchronized with a timer (grand master) having the highest time accuracy.

In the present embodiment, even if the above network configuration is changed while the production line to which the control system 1 is applied is in operation, detection of the above grand master and time synchronization can be dynamically performed in the production line while continuing the operation. In this case, by performing the above time synchronization in multiple stages, a dynamic setup change (recombination) of the production line (while continuing operation) can be performed without causing a trouble in the control of the production line in operation.

L. Appendix

The present embodiment as described above includes the following technical ideas.
[Configuration 1]
A control system (1) including:
a network configuration in which one or more control devices (100, 200) each of which controls a target are communicably connected to a network (23A),
in which each of the one or more control devices includes
a timer (101, 201) that manages time having an accuracy (113, 213),
a communicator (141, 241) for transmitting a control command to the target corresponding to the control device with the time managed by the timer as a reference, and
a timer synchronizer (151, 251) for, when the network configuration is changed, time-synchronizing, among timers of the respective control devices of the changed network configuration, other timers with a timer having a higher time accuracy than time accuracies of any of the other timers.
[Configuration 2]
The control system according to Configuration 1,
in which the control devices that are connectable to the network configuration include a first control device (200) that is in operation and a second control device (100) that is different from the first control device, and
in which the change of the network configuration includes that the second control device is added to the network configuration to which the first control device in operation is connected.
[Configuration 3]
The control system according to Configuration 2,
in which each of the control devices further includes a message communicator (152, 252) for performing communication of a message (370, 380) having an accuracy of the timer of the own device, and
in which the timer synchronizer compares the accuracy of the message received from another control device with the accuracy of the timer of the own device, and selects the timer having the higher time accuracy on the basis of a comparison result.
[Configuration 4]
The control system according to Configuration 3,
in which, in a case where the timer having the higher time accuracy is provided in the second control device, the timer synchronizer time-synchronizes the timer of the second control device with a timer of the first control device, and then time-synchronizes the timer of the first control device with the timer of the second control device (S22, S35).
[Configuration 5]
The control system according to any one of Configurations 2 to 4,
in which the control device further includes a storage part for storing network configuration information (115, 215) including an identifier of a control device connected to the network configuration, and
in which the first control device collates an identifier of the second control device with the network configuration information, and detects that the second control device has been added to the network configuration on the basis of a collation result.
[Configuration 6]
The control system according to any one of Configurations 2 to 5,
in which the second control device includes a control device that operates in cooperation with the first control device in operation when the control device is added to the network configuration, and
in which each of the control devices detects whether the own device is the first control device or the second control device.
[Configuration 7]
The control system according to any one of Configurations 1 to 6,
in which the timer synchronizer repeatedly performs a process of updating the times of the other timers in a predetermined adjustment amount N times (where N≥2), and
in which the predetermined adjustment amount includes each adjustment amount obtained by dividing a magnitude of a time difference between the other timers and the timer having the higher time accuracy into N pieces.
[Configuration 8]
A control device (100, 200) that controls a target, including:
a part for communicating with a network (23a) that communicably connects a plurality of the control devices;
a timer (101, 201) that manages time having an accuracy (113, 213);

a communicator (141, 241) for transmitting a control command to the target corresponding to the control device with the time managed by the timer as a reference; and a timer synchronizer (151, 251) for, when the control device communicably connected to the network is changed, time-synchronizing, among timers of the plurality of respective control devices connected to the network after the change, other timers with a timer having a higher time accuracy than time accuracies of any of the other timers.

[Configuration 9]

A program causing a computer to execute a method of synchronizing time with a control device (100, 200) that controls a target, the control device including a part (230) for communicating with a network that communicably connects a plurality of the control devices, a timer (101, 201) that manages time having an accuracy (113, 213), and a communicator (141, 241) for transmitting a control command to the target corresponding to the control device with the time managed by the timer as a reference, the method including:

a step (S12, S13) of, when the control device communicably connected to the network is changed, detecting a timer having a higher time accuracy than time accuracies of any of other timers among timers of the plurality of respective control devices connected to the network after the change; and a step (S22, S23, S35, S36) of time-synchronizing the other timers with the timer having the higher time accuracy.

It should be considered that the embodiments disclosed this time are exemplary in all respects and not restrictive. The scope of the present invention is shown by the claims, not the above description, and is intended to include all modifications within the equivalent meaning and scope of the claims.

What is claimed is:

1. A control system comprising:
a network configuration in which one or more control devices each of which controls a target are communicably connected to a network, wherein the control devices that are connectable to the network configuration include a first control device that is in operation and a second control device that is different from the first control device,
wherein each of the one or more control devices includes
a timer that manages time having an accuracy;
a communicator for transmitting a control command to the target corresponding to the control device with the time managed by the timer as a reference;
a timer synchronizer for, when the network configuration is changed, time-synchronizing, among timers of the respective control devices of the changed network configuration, other timers with a timer having a higher time accuracy than time accuracies of any of the other timers, wherein the change of the network configuration includes that the second control device is added to the network configuration to which the first control device in operation is connected; and
a message communicator for performing communication of a message having an accuracy of the timer of the own device,
wherein the timer synchronizer compares the accuracy of the time in the message received from another control device with the accuracy of the timer of the own device, and selects the timer having the higher time accuracy on the basis of a comparison result.

2. The control system according to claim 1,
wherein, in a case where the timer having the higher time accuracy is provided in the second control device, the timer synchronizer time-synchronizes the timer of the second control device with a timer of the first control device, and then time-synchronizes the timer of the first control device with the timer of the second control device.

3. The control system according to claim 1,
wherein each of the one or more control devices further includes a storage part for storing network configuration information including an identifier of a control device connected to the network configuration, and
wherein the first control device collates an identifier of the second control device with the network configuration information, and detects that the second control device has been added to the network configuration on the basis of a collation result.

4. The control system according to claim 1,
wherein the second control device includes a control device that operates in cooperation with the first control device in operation when the second control device is added to the network configuration, and
wherein each of the control devices detects whether the own device is the first control device or the second control device.

5. The control system according to claim 1,
wherein the timer synchronizer repeatedly performs a process of updating the times of the other timers in a predetermined adjustment amount for N times (where N≥2), and
wherein the predetermined adjustment amount includes each adjustment amount obtained by dividing a magnitude of a time difference between the other timers and the timer having the higher time accuracy into N pieces.

6. A control device that controls a target, comprising:
a part for communicating with a network that communicably connects a plurality of the control devices in a network configuration, wherein the control devices that are connectable to the network configuration include a first control device that is in operation and a second control device that is different from the first control device;
a timer that manages time having an accuracy;
a communicator for transmitting a control command to the target corresponding to the control device with the time managed by the timer as a reference;
a timer synchronizer for, when the network configuration is changed, time-synchronizing, among timers of the plurality of respective control devices connected to the network after the change, other timers with a timer having a higher time accuracy than time accuracies of any of the other timers, wherein the change of the network configuration includes that the second control device is added to the network to which the first control device in operation is connected; and
a message communicator for performing communication of a message having an accuracy of the timer of the own device,
wherein the timer synchronizer compares the accuracy of the time in the message received from another control device with the accuracy of the timer of the own device, and selects the timer having the higher time accuracy on the basis of a comparison result.

7. A non-transitory computer-readable recording medium, recording a program causing a computer to execute a method of synchronizing time with a control device that controls a target, the control device comprising:

a part for communicating with a network that communicably connects a plurality of the control devices in a network configuration, wherein the control devices that are connectable to the network configuration include a first control device that is in operation and a second control device that is different from the first control device;

a timer that manages time having an accuracy;

a communicator for transmitting a control command to the target corresponding to the control device with the time managed by the timer as a reference, the method comprising:

a step of performing communication of a message having an accuracy of the timer of the own device;

a step of, when the network configuration is changed, comparing the accuracy of the time in the message received from another control device with the accuracy of the timer of the own device, and detecting a timer having a higher time accuracy than time accuracies of any of other timers among timers of the plurality of respective control devices connected to the network after the change on the basis of a comparison result, wherein the change of the network configuration includes that the second control device is added to the network to which the first control device in operation is connected; and a step of time-synchronizing the other timers with the timer having the higher time accuracy.

8. The control system according to claim 2, wherein each of the one or more control devices further includes a storage part for storing network configuration information including an identifier of a control device connected to the network configuration, and wherein the first control device collates an identifier of the second control device with the network configuration information, and detects that the second control device has been added to the network configuration on the basis of a collation result.

9. The control system according to claim 2, wherein the second control device includes a control device that operates in cooperation with the first control device in operation when the second control device is added to the network configuration, and wherein each of the control devices detects whether the own device is the first control device or the second control device.

10. The control system according to claim 3, wherein the second control device includes a control device that operates in cooperation with the first control device in operation when the second control device is added to the network configuration, and wherein each of the control devices detects whether the own device is the first control device or the second control device.

11. The control system according to claim 8, wherein the second control device includes a control device that operates in cooperation with the first control device in operation when the second control device is added to the network configuration, and wherein each of the control devices detects whether the own device is the first control device or the second control device.

12. The control system according to claim 2, wherein the timer synchronizer repeatedly performs a process of updating the times of the other timers in a predetermined adjustment amount for N times (where $N \geq 2$), and wherein the predetermined adjustment amount includes each adjustment amount obtained by dividing a magnitude of a time difference between the other timers and the timer having the higher time accuracy into N pieces.

13. The control system according to claim 3, wherein the timer synchronizer repeatedly performs a process of updating the times of the other timers in a predetermined adjustment amount for N times (where $N \geq 2$), and wherein the predetermined adjustment amount includes each adjustment amount obtained by dividing a magnitude of a time difference between the other timers and the timer having the higher time accuracy into N pieces.

* * * * *